US 6,981,128 B2

(12) United States Patent
Fluhr et al.

(10) Patent No.: US 6,981,128 B2
(45) Date of Patent: Dec. 27, 2005

(54) ATOMIC QUAD WORD STORAGE IN A SIMULTANEOUS MULTITHREADED SYSTEM

(75) Inventors: Eric J. Fluhr, Round Rock, TX (US); Joaquin Hinojosa, Round Rock, TX (US); Ronald N. Kalla, Round Rock, TX (US); Bruce J. Ronchetti, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/422,664

(22) Filed: Apr. 24, 2003

(65) Prior Publication Data

US 2004/0216104 A1 Oct. 28, 2004

(51) Int. Cl.[7] ............................................. G06F 9/40

(52) U.S. Cl. ................................................... 712/216

(58) Field of Search .................... 712/216, 18, 218, 712/219, 206, 245; 711/150, 151, 158; 365/189.01, 365/189.04, 220, 230.01; 710/54, 40, 41, 710/240, 241, 242, 244

(56) References Cited

U.S. PATENT DOCUMENTS

| | | | |
|---|---|---|---|
| 6,282,629 B1 * | 8/2001 | Sager | 712/23 |
| 6,351,805 B2 * | 2/2002 | Janik et al. | 712/219 |
| 2003/0069920 A1 * | 4/2003 | Melvin et al. | 709/108 |
| 2004/0221138 A1 * | 11/2004 | Rosner et al. | 712/218 |

FOREIGN PATENT DOCUMENTS

FR 2835329 A1 * 8/2003
WO WO 200133352 A1 * 5/2001

* cited by examiner

*Primary Examiner*—B. James Peikari
(74) *Attorney, Agent, or Firm*—Richard F. Frankeny; Winstead Sechrest & Minick P.C.; Casimer K. Salys

(57) ABSTRACT

In a system with multiple execution units, instructions are queued to allow efficient dispatching. One load/store unit (LSU) may have a store instruction pending to a real address and a second LSU may have a load instruction pending to the same real address. An SMT system has an atomic store quad word (SQW) instruction with a data path that is only double wide and the SQW requires two cycles to complete. The SMT system requires a method to prevent between collisions in a store reorder queue (SRQ) STQ. The real address of a load word (LW) one thread is compared to the real addresses in the SRQ of the second thread. If the SQW with a real address matching the real address of the LW has not committed both of its double words, then the LW of the second thread is rejected.

9 Claims, 4 Drawing Sheets

ATOMIC QUAD WORD STORAGE IN A SIMULTANEOUS MULTITHREADED SYSTEM

TECHNICAL FIELD

The present invention relates in general to methods and circuitry for a processor having simultaneous multithreading (SMT) and single thread operation modes.

BACKGROUND INFORMATION

For a long time, the secret to more performance was to execute more instructions per cycle, otherwise known as Instruction Level Parallelism (ILP), or decreasing the latency of instructions. To execute more instructions each cycle, more functional units (e.g., integer, floating point, load/store units, etc.) have to be added. In order to more consistently execute multiple instructions, a processing paradigm called out-of-order processing (OOP) may be used, and in fact, this type of processing has become mainstream.

OOP arose because many instructions are dependent upon the outcome of other instructions, which have already been sent into the processing pipeline. To help alleviate this problem, a larger number of instructions are stored in order to allow immediate execution. The reason this is done is to find more instructions that are not dependent upon each other. The area of storage used to store the instructions that are ready to execute immediately is called the reorder buffer. The size of reorder buffers have been growing in most modern commercial computer architectures with some systems able to store as many as 126 instructions. The reason for increasing the size of the reorder buffer is simple: code that is spatially related tends also to be temporally related in terms of execution (with the possible exclusion of arrays of complex structures and linked lists). The only problem is that these instructions also have a tendency to depend upon the outcome of prior instructions. With a CPU's ever increasing amount of required code, the only current way to find more independent instructions has been to increase the size of the reorder buffer.

However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, one can focus upon a coarser form of extracting performance at the instruction or thread level, via multithreading (multiprocessing), but without the system bus as a major constraint.

The ability to put more transistors on a single chip has allowed on-chip multiprocessing (CMP). To take advantage of the potential performance increases, the architecture cannot use these multiple processors as uniprocessors but rather must use multiprocessing that relies on executing instructions in a parallel manner. This requires the programs executed on the CMP to also be written to execute in a parallel manner rather than in a purely serial or sequential manner. Assuming that the application is written to execute in a parallel manner (multithreaded), there are inherent difficulties in making the program written in this fashion execute faster proportional to the number of added processors.

The general concept behind using multiple cores on one die is to extract more performance by executing two threads at once. By doing so, the two CPUs together are able to keep a higher percentage of the aggregate number of functional units doing useful work at all times. If a processor has more functional units, then a lower percentage of those units may be doing useful work at any one time. The on-chip multiprocessor lowers the number of functional units per processor, and distributes separate tasks (or threads) to each processor. In this way, it is able to achieve a higher throughput on both tasks combined. A comparative uniprocessor would be able to get through one thread, or task, faster than a CMP chip could, because, although there are wasted functional units, there are also "bursts" of activity produced when the processor computes multiple pieces of data at the same time and uses all available functional units. One idea behind multiprocessors is to keep the individual processors from experiencing such burst activity times and instead have each processor use what resources it has available more frequently and therefore efficiently. The non-use of some of the functional units during a clock cycle is known as "horizontal waste," which CMP tries to avoid.

However, there are problems with CMP. The traditional CMP chip sacrifices single-thread performance in order to expedite the completion of two or more threads. In this way, a CMP chip is comparatively less flexible for general use, because if there is only one thread, an entire half of the allotted resources are idle and completely useless (just as adding another processor in a system that uses a singly threaded program is useless in a traditional multiprocessor (MP) system). One approach to making the functional units in a CMP more efficient is to use course-grained multithreading (CMT). CMT improves the efficiency with respect to the usage of the functional units by executing one thread for a certain number of clock cycles. The efficiency is improved due to a decrease in "vertical waste." Vertical waste describes situations in which none of the functional units are working due to one thread stalling.

When switching to another thread, the processor saves the state of that thread (i.e., it saves where instructions are in the pipeline, which units are being used) and switches to another one. It does so by using multiple register sets. The advantage of this is due to the fact that often a thread can only go for so long before it falls upon a cache miss, or runs out of independent instructions to execute. A CMT processor can only execute as many different threads in this way as it has support for. So, it can only store as many threads as there are physical locations for each of these threads to store the state of their execution. An N-way CMT processor would therefore need to have the ability to store the state of N threads.

A variation on this concept would be to execute one thread until it has experienced a cache miss (usually a L2 (secondary) cache miss), at which point the system would switch to another thread. This has the advantage of simplifying the logic needed to rotate the threads through a processor, as it will simply switch to another thread as soon as the prior thread is stalled. The penalty of waiting for a requested block to be transferred back into the cache is then alleviated. This is similar to the hit under miss (or hit under multiple miss) caching scheme used by some processors, but it differs because it operates on threads instead of upon instructions. The advantages of CMT over CMP are CMT does not sacrifice single-thread performance, and there is less hardware duplication (less hardware that is halved to make the two processors "equal" to a comparable CMT).

A more aggressive approach to multithreading is called fine-grained multithreading (FMT). Like CMT, the basis of FMT is to switch rapidly between threads. Unlike CMT, however, the idea is to switch each and every cycle. While both CMT and FMT actually do indeed slow down the completion of one thread, FMT expedites the completion of all the threads being worked on, and it is overall throughput which generally matters most.

CMPs may remove some horizontal waste in and unto themselves. CMT and FMT may remove some (or all) vertical waste. However an architecture that comprises an advanced form of multithreading, referred to as Simultaneous Multithreading (SMT), may be used to reduce both horizontal and vertical waste. The major goal of SMT is to have the ability to run instructions from different threads at any given time and in any given functional unit. By rotating through threads, an SMT architecture acts like an FMT processor, and by executing instructions from different threads at the same time, it acts like CMP. Because of this, it allows architects to design wider cores without the worry of diminishing returns. It is reasonable for SMT to achieve higher efficiency than FMT due to its ability to share "unused" functional units among differing threads; in this way, SMT achieves the efficiency of a CMP machine. However, unlike a CMP system, an SMT system makes little to no sacrifice (the small sacrifice is discussed later) for single threaded performance. The reason for this is simple. Whereas much of a CMP processor remains idle when running a single thread and the more processors on the CMP chip makes this problem more pronounced, an SMT processor can dedicate all functional units to the single thread. While this is obviously not as valuable as being able to run multiple threads, the ability to balance between single thread and multithreaded environments is a very useful feature. This means that an SMT processor may exploit thread-level parallelism (TLP) if it is present, and if not, will give full attention to instruction level parallelism (ILP).

In order to support multiple threads, an SMT processor requires more registers than the traditional superscalar processor. The general aim is to provide as many registers for each supported thread as there would be for a uniprocessor. For a traditional reduced instruction set computer (RISC) chip, this implies 32 times N registers (where N is the number of threads an SMT processor could handle in one cycle), plus whatever renaming registers are required. For a 4-way SMT processor RISC processor, this would mean 128 registers, plus however many renaming registers are needed.

Most SMT models are straightforward extensions of a conventional out-of-order processor. With an increase in the actual throughput comes more demands upon instruction issue width, which should be increased accordingly. Because of the aforementioned increase in the register file size, an SMT pipeline length may be increased by two stages (one to select register bank and one to do a read or write) so as not to slow down the length of the clock cycle. The register read and register write stages are therefore both broken up into two pipelined stages.

In order to not allow any one thread to dominate the pipeline, an effort should be made to ensure that the other threads get a realistic slice of the execution time and resources. When the functional units are requesting work to do, the fetch mechanism will provide a higher priority to those threads that have the fewest instructions already in the pipeline. Of course, if the other threads have little they can do, more instructions from the thread are already dominating the pipelines.

SMT is about sharing whatever possible. However, in some instances, this disrupts the traditional organization of data, as well as instruction flow. The branch prediction unit becomes less effective when shared, because it has to keep track of more threads with more instructions and will therefore be less efficient at giving an accurate prediction. This means that the pipeline will need to be flushed more often due to miss prediction, but the ability to run multiple threads more than makes up for this deficit.

The penalty for a misprediction is greater due to the longer pipeline used by an SMT architecture (by two stages), which is in turn due to the rather large register file required. However, techniques have been developed to minimize the number of registers needed per thread in an SMT architecture. This is done by more efficient operating system (OS) and hardware support for better deallocation of registers, and the ability to share registers from another thread context if another thread is not using all of them.

Another issue is the number of threads in relation to the size of caches, the line sizes of caches, and the bandwidth afforded by them. As is the case for single-threaded programs, increasing the cache-line size decreases the miss rate but also increases the miss penalty. Having support for more threads which use more differing data exacerbates this problem and thus less of the cache is effectively useful for each thread. This contention for the cache is even more pronounced when dealing with a multiprogrammed workload over a multithreaded workload. Thus, if more threads are in use, then the caches should be larger. This also applies to CMP processors with shared L2 caches.

The more threads that are in use results in a higher overall performance and the differences in association of memory data become more readily apparent. There is an indication that when the L1 (primary) cache size is kept constant, the highest level of performance is achieved using a more associative cache, despite longer access times. Tests have been conducted to determine performance with varying block sizes that differ associatively while varying the numbers of threads. As before, increasing the associative level of blocks increased the performance at all times; however, increasing the block size decreased performance if more than two threads were in use. This was so much so that the increase in the degree of association of blocks could not make up for the deficit caused by the greater miss penalty of the larger block size.

An atomic operation, or atomicity, implies an operation that must be performed entirely or not at all. For example, if machine failure prevents a transaction from being processed to completion, the system will be rolled back to the start of the transaction. When doing a store operation in SMT, it may be necessary to store an entire quad word atomically. Many times the data path is not wide enough to handle an atomic store operation in a single cycle. For example, an atomic quad word store may be used in a data path that is only double wide. In this case, it requires two cycles to store the entire quad word. If a condition occurs wherein the dual word store port is blocked during a store operation, half of the quad word may be committed for storage and half may be blocked. Single thread operation has collision protection between a load and a store to the same real address. In SMT, this does not protect against a second thread executing a load of an incomplete atomic quad word store.

There is, therefore, a need in an SMT system for a method and circuitry that ensures cross-thread collision protection for atomic load/store operations.

SUMMARY OF THE INVENTION

In an SMT system each thread has a store reorder queue (SRQ) and a load reorder queue (LRQ). Logic, coupling these two units, protects against a collision where multiple execution units may try to do a load from a real address before a pending store to the same real address is completed. This is especially important for atomic load/store operations where the data path is narrower than the executable atomic load/store operation. For example, an atomic quad word load/store that is executable in a double word data path requires two cycles to complete the quad word operation. In SMT, a method for ensuring that a store quad word operation is atomic uses a compare of the real addresses in the SRQ of the first thread to the read address of a load word of a second thread. When a second thread executes a load word (either a quad word or simply a load), the real address of the load word (LW) is compared to the real addresses in the SRQ of the first thread. If there is a compare between two real addresses, a possible collision between the two threads for the load/store operation is possible. The condition indicating there is a compare of the real addresses signals the first thread SRQ to give a status of the quad word atomic store for the matching real address. If the status indicates that both halves of the quad word have not committed, then the load request for the second thread to the matching real addresses is rejected.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
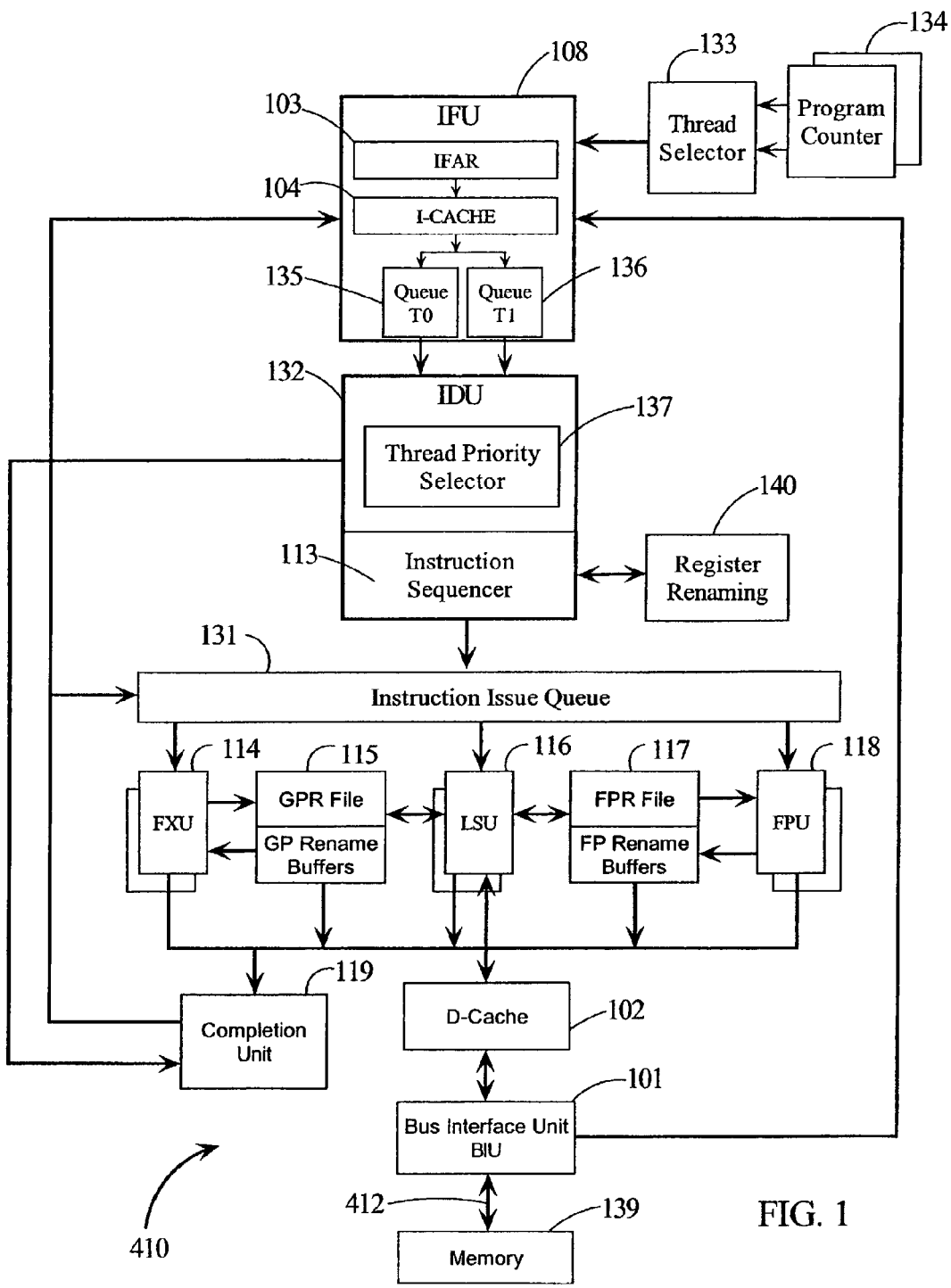
FIG. 1 is a block diagram of functional units in an SMT processor according to embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there are illustrated details of CPU 410. CPU 410 is designed to execute multiple instructions per clock cycle. Thus, multiple instructions may be executing in any of the execution units, fixed point units (FXUs) 114, floating point units (FPUs) 118, and load/store units (LSUs) 116 during any one clock cycle. Likewise, CPU 410 may simultaneously execute instructions from multiple threads in an SMT mode.

Program counters (PCs) 134 correspond to thread zero (T0) and thread one (T1) that have instructions for execution. Thread selector 133 alternately selects between T0 and T1 to couple an instruction address to instruction fetch unit (IFU) 108. Instruction addresses are loaded into instruction fetch address register (IFAR) 103. IFAR 103 alternately fetches instructions for each thread from instruction cache (I-Cache) 104. Instructions are buffered in instruction queue (IQ) 135 for T0 and IQ 136 for T1. IQ 135 and IQ 136 are coupled to instruction dispatch unit (IDU) 132. Instructions are selected and read from IQ 135 and IQ 136 under control of thread priority selector 137. Normally, thread priority selector 137 reads instructions from IQ 135 and IQ 136 substantially proportional to each thread's program controlled priority.

The instructions are decoded in a decoder (not shown) in IDU 132. Instruction sequencer 113 then may place the instructions in groups in an order determined by various algorithms. The groups of instructions are forwarded to instruction issue queue (IIQ) 131. The instruction sequencer 113 receives instructions from both threads in program order, but the instructions may be issued from the IIQ 131 out of program order and from either thread. The general purpose register (GPR) file 115 and floating point register (FPR) file 117 are used by multiple executing units and represent the program state of the system. These hardware registers may be referred to as the "architected" registers. When an instruction is put into an issue queue, each architected register is renamed. Each architected register that is being modified is assigned a physical register and a corresponding look-up table identifies physical registers that are associated with an architected register. Therefore in the issue queue, the architected register has been renamed so that multiple copies of an architected register may exist at the same time. This allows instructions to be executed out-of-order as long as source operands are available. Register renaming unit 140, renames and maps the registers so that unused physical registers may be reassigned when all instructions referencing a particular physical register complete and the physical register does not contain the latest architected state.

Instructions are queued in IIQ 131 for execution in the appropriate execution unit. If an instruction contains a fixed point operation, then any of the multiple fixed point units (FXUs) 114 may be used. All of the execution units, FXU 114, FPU 118 and LSU 116 are coupled to completion unit 119 that has completion tables (not shown) indicating which of the issued instructions have completed and other status information. Information from completion unit 119 is forwarded to IFU 108. IDU 132 may also send information to completion unit 119. Data from a store operation from LSU 116 is coupled to data cache (D-Cache) 102. This data may be stored in D-Cache 102 for near term use and/or forwarded to bus interface unit (BIU) 101 which sends the data over bus 412 to memory 139. LSU 116 may load data from D-Cache 102 for use by the execution units (e.g., FXU 114).

Figure 2:
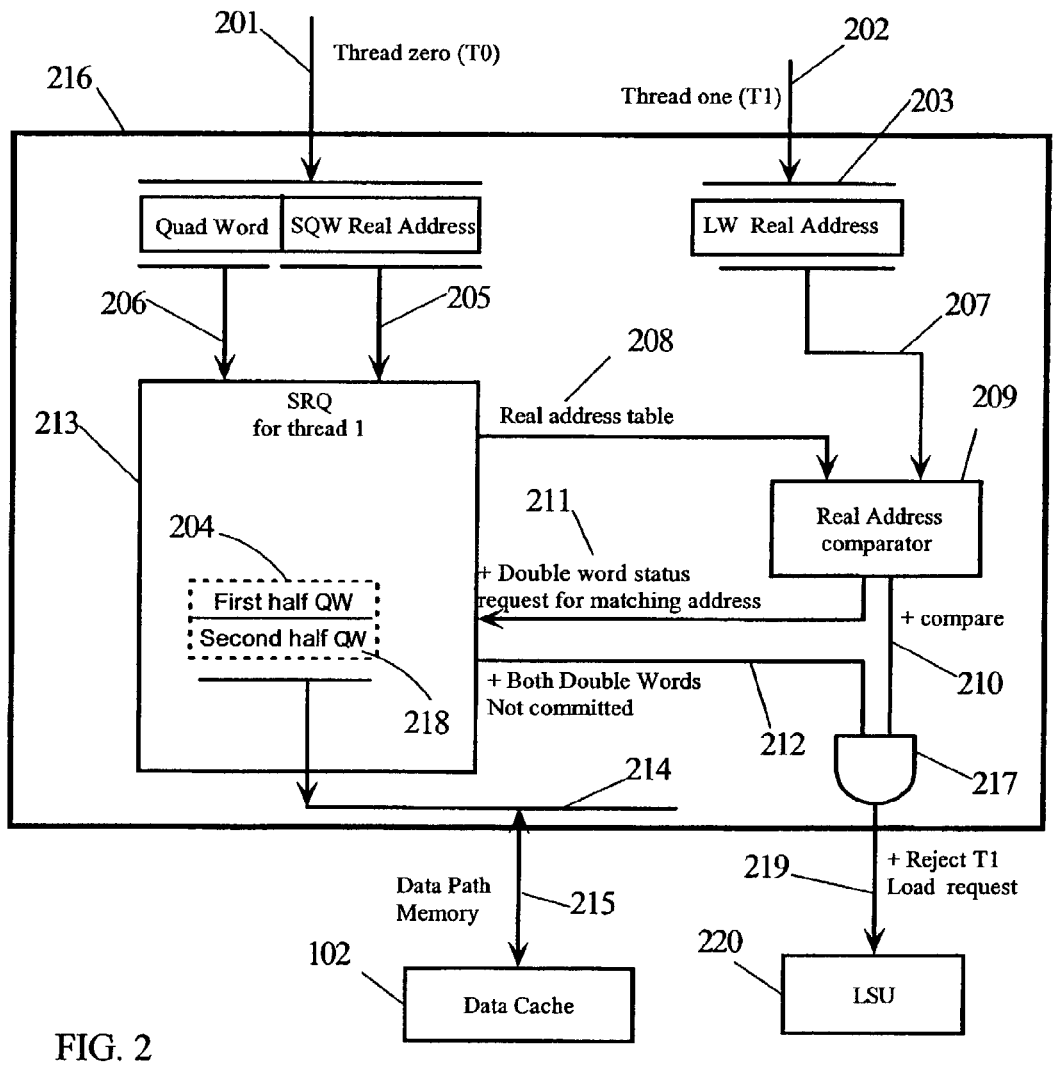
FIG. 2 is a block diagram of circuitry in an embodiment of the present invention.

FIG. 2 is a block diagram of circuitry in an exemplary LSU 216 within a number of LSUs 116. A store quad word (SQW) instruction 201 comprises a real address 205 for storing quad word 206. Quad word may be thought of as comprising two double words. The memory data path 215 is a double word data path. Store register queue (SRQ) 213 stores a quad word 206 as two double words, first half quad word 204 and second half quad word 218. To complete an atomic SQW, both 204 and 218 must be committed. If the memory data path 215 is blocked (e.g., busy) after a store of the first half quad word 204 is committed but before second half quad word is committed, there is a possible collision between an atomic SQW from one thread (T0) and a load word (LW) operation from a second thread (T1) to the same real address. In embodiments of the present invention, LW requests for T1 are examined relative to addresses in SRQ 213 for T0 (and vice versa). A LW real address 203 is coupled via 207 to address comparator 209. Real address 203 for a LW 202 from T1 is compared to a real address table 208 from SRQ 213 for T0. If there is a match between real address 203 and a real address of an atomic SQW in SRQ 213, then a request signal 211 retrieves the status of both double words making up an atomic SQW with the same real address (real address 207). If both halves of the quad word (e.g., 204 and 218) have not been committed, then not committed signal 212 is combined with compare signal 210 in logic AND 217 to generate a reject signal 219, rejecting the LW of T1 in LSU 220 from the matching real address 203. Other types of commands that would stop an LW of T1 as the result of a collision with T0 for the atomic SQW are possible; however, a reject command may be the least disruptive.

In embodiments of the present invention, any size LW operation from a thread (e.g., T0) is rejected if the other thread T1 has any valid SQW which overlaps the address of the LW from T0. For example, if T0 does multiple LWs that overlap an SQW of T1, the LWs of T0 must be rejected to ensure that LW operations return data from the SQW or T1 as atomic data.

Figure 3:
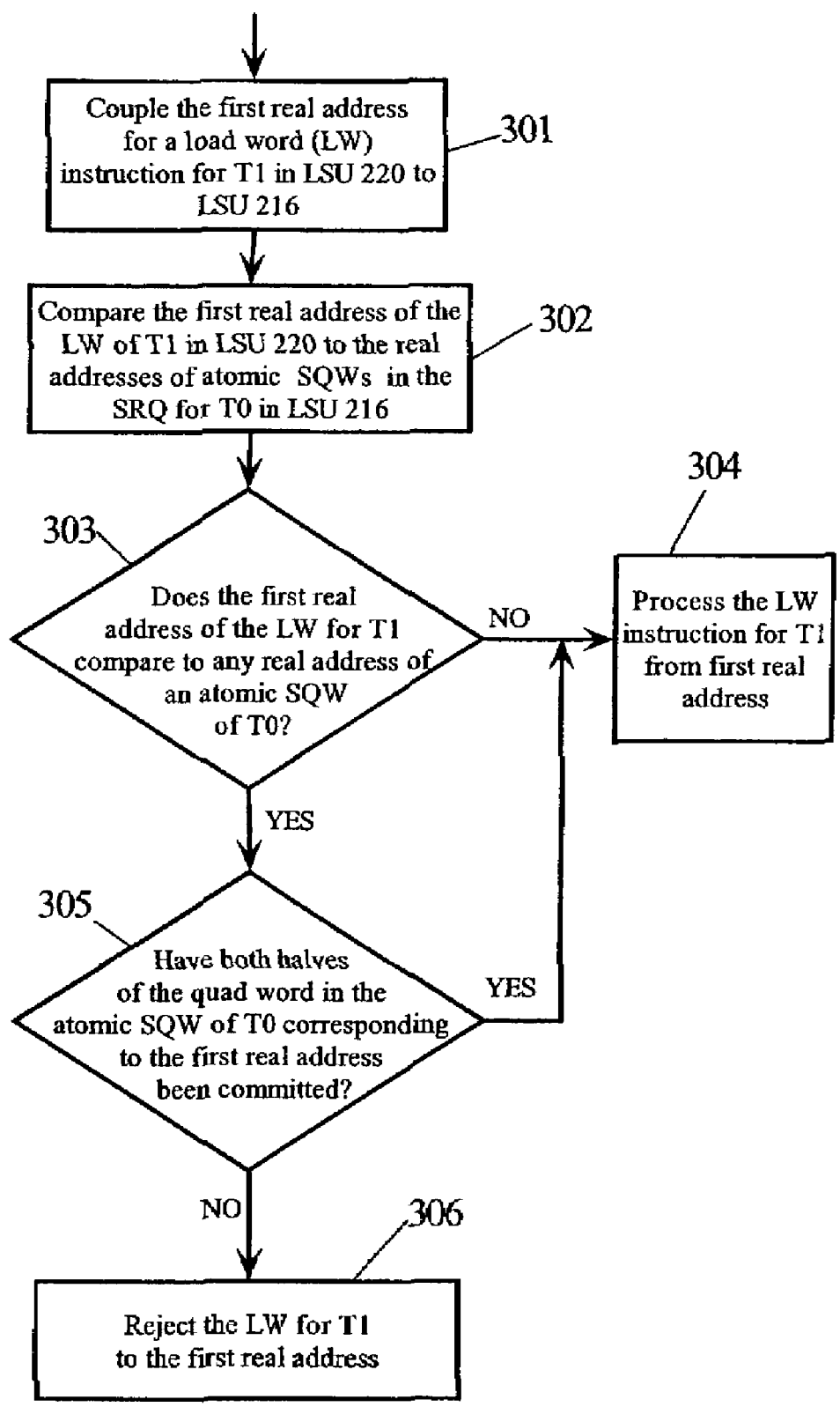
FIG. 3 is a flow diagram of method steps according to embodiments of the present invention.

FIG. 3 is a flow diagram of method steps according to embodiments of the present invention. In step 301, a first real address of an LW instruction for T1 in an LSU 220 is coupled to an LSU 216. In step 302, the first real address for the LW of T1 is compared to the real addresses of atomic SQWs in the SRQ 213 for T0. In step 303, a test is done to determine if there is a match between the first real address for the LW of T1 and a real address for an atomic SQW for T0. If the result of the test in step 303 is NO, then in step 304 the LW for T1 is processed. If the result of the test in step 303 is YES, then in step 305 a test is done to determine if both halves of the quad word, corresponding to the atomic SQW having matching real address 207, have been committed. If the result of the test in step 305 is NO, then in step 306, the LW instruction for T1 from real address 207 is rejected. If the result of the test in step 305 is YES, then step 304 is again executed.

Figure 4:
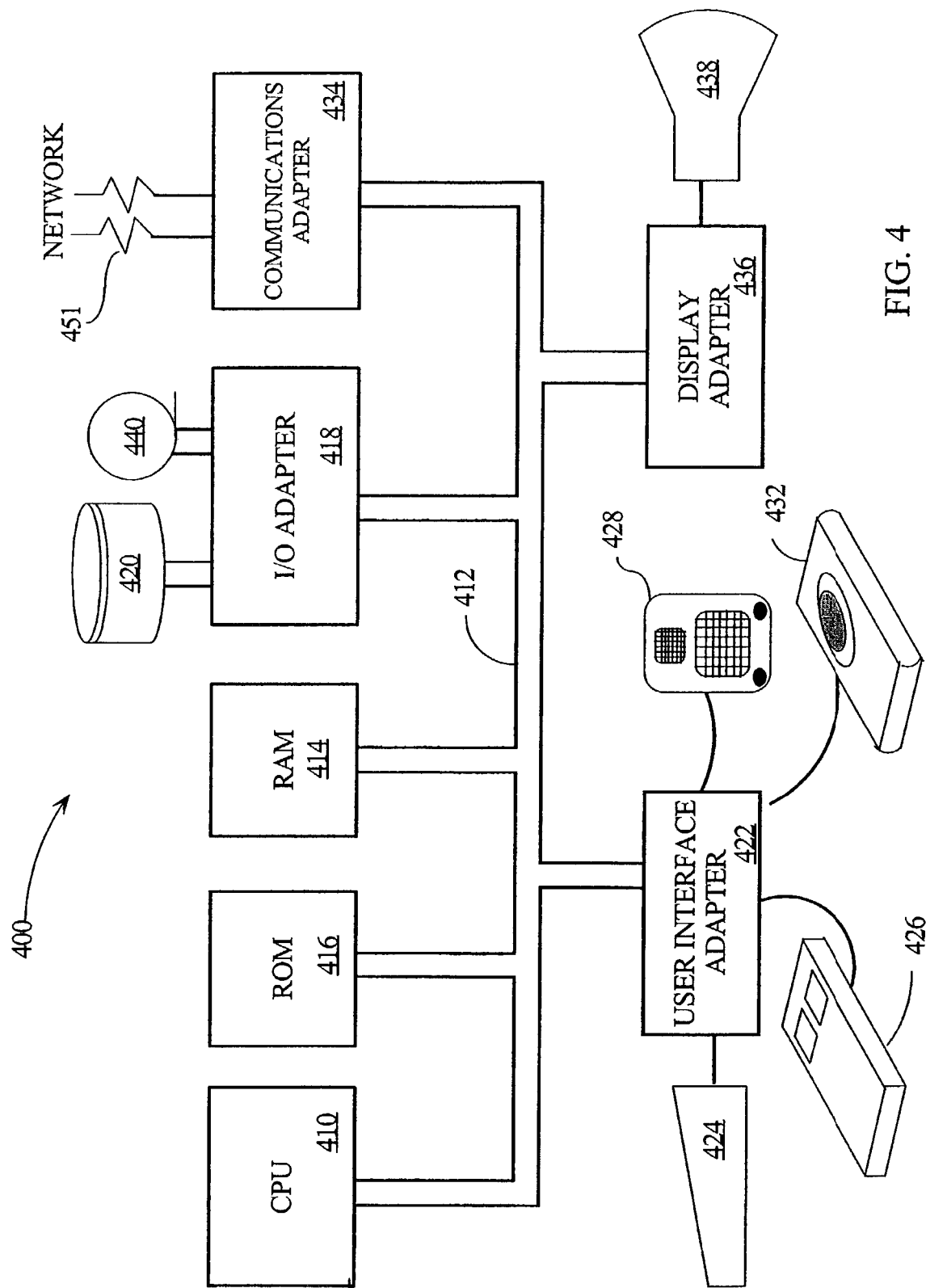
FIG. 4 is a representative hardware environment for practicing the present invention.

A representative hardware environment for practicing the present invention is depicted in FIG. 4, which illustrates a typical hardware configuration of a workstation in accordance with the subject invention having central processing unit (CPU) 410 with simultaneous multithread (SMT) processing and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method for preventing load/store collisions between multiple threads in an SMT system with a plurality of load/store units comprising the steps of:
    coupling a first address for a first load word (LW) request to a first load/store unit (LSU) for a first thread to circuitry comprising a store reorder queue (SRQ) for a second thread in a second LSU;
    comparing said first address of said first LW request to addresses of atomic store Quadword (SQW) in said SRQ for said second thread;
    determining if first and second words making up an atomic SQW corresponding to said first address have been committed to storage if there is a match in said comparing step; and
    rejecting said first LW request from said first address if there is a match in said comparing step and both of said first and second words have not been committed to storage.

2. The method of claim 1 further comprising the step of issuing said first LW request if there is a match in said comparing step and both of said first and second words have been committed.

3. The method of claim 1 further comprising the step of issuing said first load word request if there is no match in said comparing step.

4. A simultaneous multithread (SMT) processor comprising:
    issue queues for issuing load and store instructions from multiple threads;
    a plurality of load/store units (LSUs) coupled to said issue queues;
    circuitry for coupling a first address for a first load word (LW) request to a first LSU for a first thread to circuitry comprising a store reorder queue (SRQ) for a second thread in a second LSU;
    circuitry for comparing to determine if there is a match of said first address of said first LW request to addresses of atomic store Quadword (SQW) in said SRQ for said second thread and generating a compare signal with a first logic state if there is a match and a second logic state if there is no match;
    circuitry for determining if first and second words making up an atomic (SQW) corresponding to said first address have been committed to storage if said compare signal has said first logic state; and
    circuitry for rejecting said first LW request from said first address if said compare signal has said first logic state and both of said first and second words have not been committed to storage.

5. The processor of claim 4 further comprising circuitry for issuing said first LW request if said compare signal has said first logic state and both of said first and second words have been committed to storage.

6. The processor of claim 4 further comprising circuitry for issuing said first LW request if said compare signal has said second logic state.

7. A data processing system comprising:
    a central processing unit (CPU) having a simultaneous multithread (SMT) processor;
    a random access memory (RAM);
    an input output (I/O) adapter;
    a communications adapter;

a bus coupling said CPU, RAM, I/O adapter, and said communications adapter;

issue queues for issuing load and store instructions from multiple threads within said SMT processor;

a plurality of load/store units (LSUs) coupled to said issue queues;

circuitry for coupling a first address for a first load word (LW) request to a first LSU for a first thread to circuitry comprising a store reorder queue (SRQ) for a second thread in a second LSU;

circuitry for comparing to determine if there is a match of said first address of said first LW request to addresses of atomic store Quadword (SQW) in said SRQ for said second thread and generating a compare signal with a first logic state if there is a match and a second logic state if there is no match;

circuitry for determining if first and second words making up an atomic (SQW) corresponding to said first address have been committed to storage if said compare signal has said first logic state; and circuitry for rejecting said first LW request from said first address if said compare signal has said first logic state and both of said first and second words have not been committed to storage.

8. The data processing system of claim 7 further comprising circuitry for issuing said first LW request if said compare signal has said first logic state and both of said first and second words have been committed to storage.

9. The data processing system of claim 7 further comprising circuitry for issuing said first LW request if said compare signal has said second logic state.

* * * * *